(12) United States Patent
Yu et al.

(10) Patent No.: US 8,512,892 B2
(45) Date of Patent: Aug. 20, 2013

(54) BATTERY SEPARATOR, METHOD OF MANUFACTURING A BATTERY SEPARATOR, BATTERY, BATTERY PACK, AND ELECTRONIC APPARATUS

(75) Inventors: Chak Chung Andrew Yu, Miyagi (JP);
Takahiro Kawana, Miyagi (JP);
Nobuyuki Nagaoka, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/364,097

(22) Filed: Feb. 1, 2012

(65) Prior Publication Data
US 2012/0202103 A1 Aug. 9, 2012

(30) Foreign Application Priority Data

Feb. 7, 2011 (JP) ................................ 2011-023686
Feb. 25, 2011 (JP) ................................ 2011-039711

(51) Int. Cl.
*H01M 2/16* (2006.01)
*B05D 5/12* (2006.01)

(52) U.S. Cl.
USPC ........................................... 429/144; 427/58

(58) Field of Classification Search
USPC ............................ 429/144; 427/58; 977/755
See application file for complete search history.

(56) References Cited

U.S. PATENT DOCUMENTS

| | | | | |
|---|---|---|---|---|
| 7,531,270 | B2 * | 5/2009 | Buck et al. ..................... | 429/120 |
| 2011/0045349 | A1 * | 2/2011 | Pushparaj et al. ............. | 429/212 |
| 2012/0015232 | A1 * | 1/2012 | Teshima et al. ............... | 429/145 |

FOREIGN PATENT DOCUMENTS

| | | |
|---|---|---|
| JP | 3797729 | 7/2006 |
| JP | 2009-016279 | 1/2009 |

\* cited by examiner

*Primary Examiner* — Mark F Huff
*Assistant Examiner* — Monique Wills
(74) *Attorney, Agent, or Firm* — K&L Gates LLP

(57) ABSTRACT

A battery separator includes a porous base material and a heat-resistant layer. The porous base material includes a first surface, a second surface opposed to the first surface, and a hole. The hole is formed in the porous base material and causes the first surface and the second surface to communicate with each other. The heat-resistant layer is configured to cover at least the first surface and a surface of the hole. The heat-resistant layer is formed of an inorganic material and deposited by an atomic layer deposition method.

34 Claims, 10 Drawing Sheets

| Sample No. | Thickness of heat-resistant layer (nm) | Air resistance (s/100ml) | Contact angle (°) |
|---|---|---|---|
| 1 | 0 | 300 | 14.4 |
| 2 | 2 | 320 | <10 |
| 3 | 10 | 420 | <10 |
| 4 | 20 | 2000 | <10 |

BATTERY SEPARATOR, METHOD OF MANUFACTURING A BATTERY SEPARATOR, BATTERY, BATTERY PACK, AND ELECTRONIC APPARATUS

CROSS REFERENCES TO RELATED APPLICATIONS

The present application claims priority to Japanese Priority Patent Application JP 2011-023686 filed in the Japan Patent Office on Feb. 7, 2011, and Japanese Priority Patent Application JP 2011-039711 filed in the Japan Patent Office on Feb. 25, 2011, the entire content of which are hereby incorporated by reference.

BACKGROUND

The present disclosure relates to a battery separator interposed between a positive electrode and a negative electrode, a method of manufacturing a battery separator, a battery including the battery separator, a battery pack, and an electronic apparatus.

For example, a generally-used lithium-ion secondary battery includes a positive electrode containing a lithium composite oxide, a negative electrode containing a material capable of absorbing and releasing lithium ions, a separator interposed between the positive electrode and the negative electrode, and a non-aqueous electrolyte solution. The positive electrode and the negative electrode are laminated on each other via the separator or wound after the lamination, to thereby form a columnar wound electrode. The separator plays a role in electrically isolating the positive electrode and the negative electrode from each other and a role in holding the non-aqueous electrolyte solution. As the separator of such a lithium-ion secondary battery, a microporous polyolefin membrane is generally used.

The microporous polyolefin membrane exhibits excellent electrical insulation property and ion permeability and therefore it has been widely used as a separator of the lithium-ion secondary battery described above, a capacitor, and the like. The lithium-ion secondary battery has high power density and high capacitance density. However, since the lithium-ion secondary battery uses an organic solvent for a non-aqueous electrolyte solution, the non-aqueous electrolyte solution may be decomposed due to heat generated under abnormal conditions such as short circuit and overcharge, which may lead to ignition in the worst case. To prevent such a situation, some safety functions are incorporated into the lithium-ion secondary battery, one of which is a shutdown function of a separator.

The shutdown function of a separator is a function of, when a battery generates abnormal heat, clogging minute pores of the separator by thermal fusion or the like of a resin material and suppressing ion conduction in the non-aqueous electrolyte solution, to thereby stop the progress of an electrochemical reaction. Generally, a lower shutdown temperature provides higher safety, and one of reasons why polyethylene is used as a component of a separator is that polyethylene has an appropriate shutdown temperature. In such a separator, for example, a resin film uniaxially or biaxially stretched is used so as to obtain porous property and improve strength.

In the case of shutdown, however, the separator is shrunk, and therefore the positive electrode and the negative electrode come into contact with each other, which may cause a secondary failure such as internal short circuit. Therefore, it has been demanded to reduce thermal contraction by improving heat resistance of the separator, and thus to improve safety.

For example, Japanese Patent Application Laid-open No. 2009-16279 discloses a separator including a covering layer in which a fine skeleton of a polyolefin resin is covered with a glass layer. Further, Japanese Patent No. 3797729 discloses a battery separator in which an inorganic thin film is formed by a sol-gel method on the surface of a polyolefin porous film without clogging a hole.

SUMMARY

In view of the circumstances as described above, it is desirable to provide a battery separator excellent in heat resistance, a method of manufacturing a battery separator, a battery including the battery separator, a battery pack, and an electronic apparatus.

According to an embodiment of the present disclosure, there is provided a battery separator including a porous base material and a heat-resistant layer.

The porous base material includes a first surface, a second surface opposed to the first surface, and a hole that is formed in the porous base material and causes the first surface and the second surface to communicate with each other.

The heat-resistant layer is configured to cover at least the first surface and a surface of the hole. The heat-resistant layer is formed of an inorganic material and deposited by an atomic layer deposition method.

In the battery separator, since the heat-resistant layer is formed by the atomic layer deposition method, the heat-resistant layer can be formed not only on the surface of the base material but also on the surface of the hole within the base material. Accordingly, as compared to the case where the heat-resistant layer is formed only on the surface of the base material, heat resistance of the separator can be improved.

It should be noted that "to cover a surface" means that, without being limited to the case of covering the entire surface, a part of the surface only needs to be covered as long as desired heat resistance is obtained.

The heat-resistant layer may cover the first surface, the second surface, and the surface of the hole.

Accordingly, the heat resistance of the separator can be additionally improved.

It should be noted that the separator may include a hole that is provided to at least one of the first surface and the second surface and does not cause the first surface and the second surface to communicate with each other, in addition to the hole that causes the first surface and the second surface to communicate with each other. Further, the hole that does not cause the first and second surfaces to communicate with each other may also be provided with the heat-resistant layer.

The thickness of the heat-resistant layer is not particularly limited and is 2 nm or more and 10 nm or less, for example. In the case where the thickness of the heat-resistant layer is less than 2 nm, there may be a case where the heat resistance is not improved depending on a base material. Further, a contact angle becomes large, and thus an electrolyte is difficult to penetrate into the hole of the separator. On the other hand, in the case where the thickness of the heat-resistant layer exceeds 10 nm, it is difficult to stably obtain a primary shutdown function of the separator depending on a base material. However, in the case where an inner diameter of the hole is large, e.g., 100 nm or more, the thickness of the heat-resistant layer may exceed 10 nm (for example, 20 nm). As long as the shutdown function of the separator can be ensured, the thickness of the heat-resistant layer can be set as appropriate in accordance with the inner diameter of the hole.

The thickness of the first surface, that of the second surface, and that of the heat-resistant layer covering the surface of the hole may be almost uniform or different from one another. In the case where the first surface, the second surface, and the heat-resistant layer are different in thickness from one another, for example, the thickness of the heat-resistant layer that covers the first surface (or second surface) may be larger than that of the heat-resistant layer that covers the surface of the hole.

Further, the heat-resistant layer that covers the surface of the hole may be formed in an almost uniform thickness or may have a distribution of thickness. For example, as a distance from the first surface and the second surface is increased in the hole, the thickness of the heat-resistant layer may be gradually reduced. Alternatively, in the heat-resistant layer that covers the surface of the hole, the thickness of the heat-resistant layer formed at the center in the thickness direction of the separator may be smaller than that of other portions. With this structure, a space is generated in the hole of the separator, with the result that air resistance can be reduced (a degree of penetration of the electrolyte solution is increased) while heat resistance is ensured.

Examples of the inorganic material that forms the heat-resistant layer include an aluminum oxide, a silicon oxide, and a titanium oxide. Those materials enhance the heat resistance of the base material and allow a film to be formed by the atomic layer deposition method.

According to an embodiment of the present disclosure, there is provided a method of manufacturing a battery separator, including preparing a porous base material including a first surface, a second surface opposed to the first surface, and a hole that is formed in the porous base material and causes the first surface and the second surface to communicate with each other.

A heat-resistant layer is formed by an atomic layer deposition method, the heat-resistant layer being configured to cover at least the first surface and a surface of the hole and being formed of an inorganic material.

In the method of manufacturing a battery separator, since the heat-resistant layer is formed by the atomic layer deposition method, the heat-resistant layer can be formed not only on the surface of the base material but also the surface of the hole within the base material. Accordingly, as compared to the case where the heat-resistant layer is formed only on the surface of the base material, heat resistance of the separator can be improved.

According to an embodiment of the present disclosure, there is provided a battery including a positive electrode, a negative electrode, an electrolyte layer, and a separator.

The electrolyte layer is arranged between the positive electrode and the negative electrode.

The separator includes a porous base material and a heat-resistant layer.

The porous base material includes a first surface opposed to the positive electrode, a second surface opposed to the negative electrode, and a hole that is formed in the porous base material and causes the first surface and the second surface to communicate with each other. The heat-resistant layer covers at least the first surface and a surface of the hole. The heat-resistant layer is formed of an inorganic material and deposited by an atomic layer deposition method.

According to an embodiment of the present disclosure, there is provided a battery pack including a battery, a control unit, and a package body.

The battery includes a positive electrode, a negative electrode, an electrolyte layer, and a separator. The electrolyte layer is arranged between the positive electrode and the negative electrode. The separator includes a porous base material and a heat-resistant layer. The porous base material includes a first surface opposed to the positive electrode, a second surface opposed to the negative electrode, and a hole that is formed in the porous base material and causes the first surface and the second surface to communicate with each other. The heat-resistant layer covers at least the first surface and a surface of the hole. The heat-resistant layer is formed of an inorganic material and deposited by an atomic layer deposition method.

The control unit is configured to control charge and discharge of the battery.

The package body is configured to support the battery and the control unit.

According to an embodiment of the present disclosure, there is provided an electronic apparatus including a battery and a power receiving circuit.

The battery includes a positive electrode, a negative electrode, an electrolyte layer, and a separator. The electrolyte layer is arranged between the positive electrode and the negative electrode. The separator includes a porous base material and a heat-resistant layer. The porous base material includes a first surface opposed to the positive electrode, a second surface opposed to the negative electrode, and a hole that is formed in the porous base material and causes the first surface and the second surface to communicate with each other. The heat-resistant layer covers at least the first surface and a surface of the hole. The heat-resistant layer is formed of an inorganic material and deposited by an atomic layer deposition method.

The power receiving circuit is configured to receive power supply from the battery.

According to the present disclosure, heat resistance of a separator can be improved.

Additional features and advantages are described herein, and will be apparent from the following Detailed Description and the figures.

DETAILED DESCRIPTION

Hereinafter, embodiments of the present disclosure will be described with reference to the drawings.

First Embodiment

Structure of Non-Aqueous Electrolyte Battery

Figure 1:
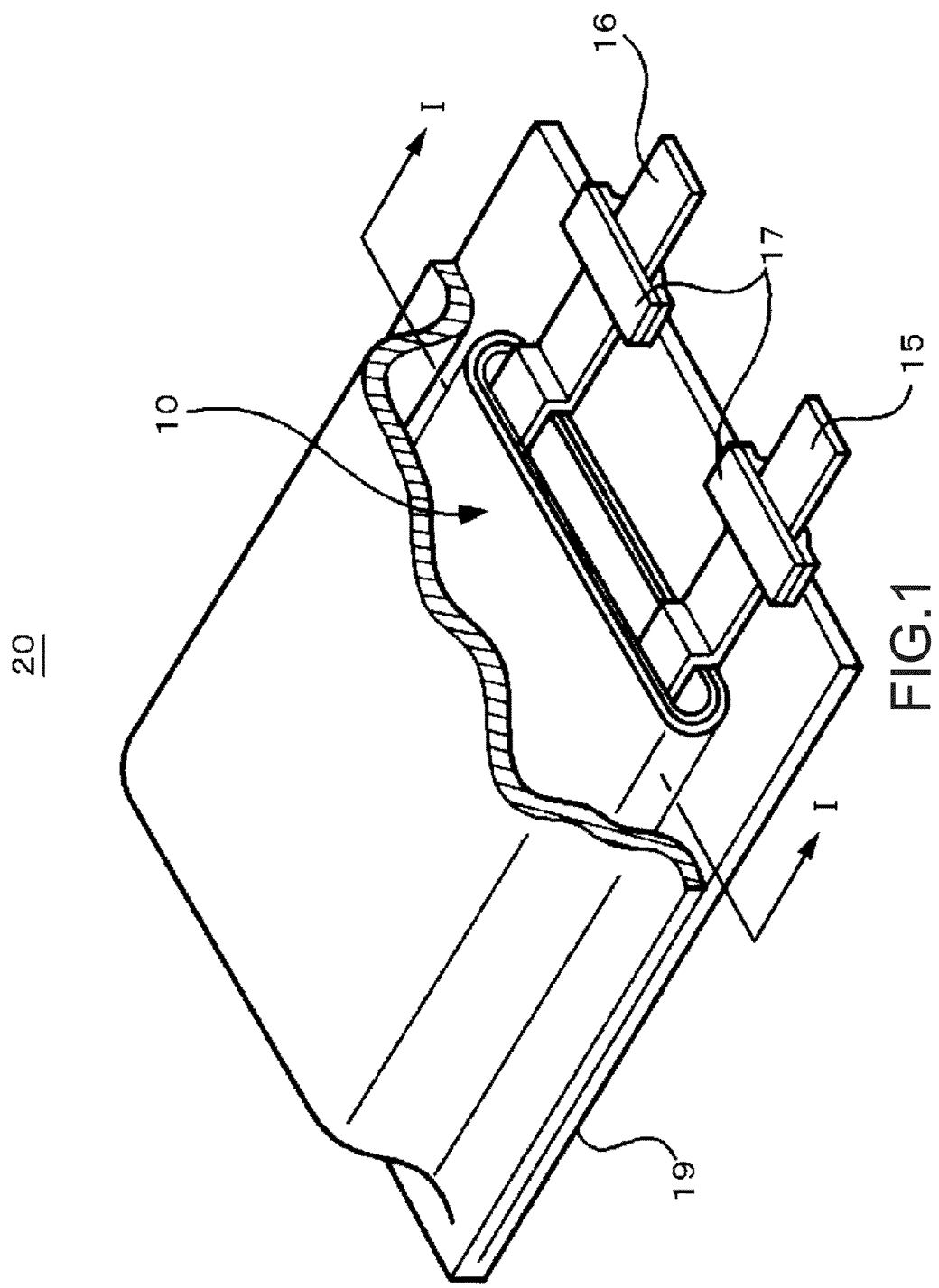
FIG. 1 is a perspective view, partially broken away, showing an internal structure of a battery including a battery separator according to an embodiment of the present disclosure.
Figure 2:
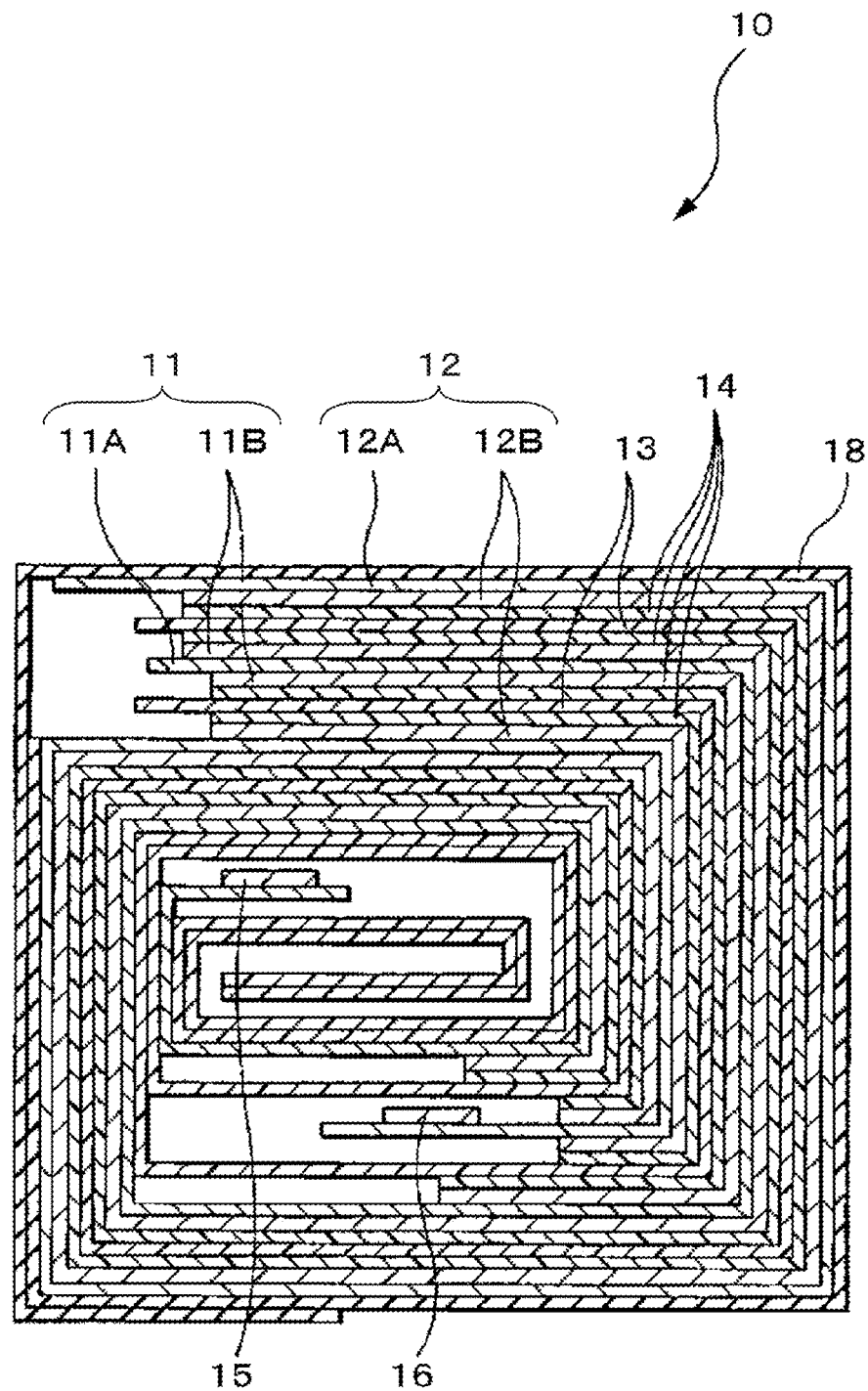
FIG. 2 is a schematic cross-sectional view taken along the line I-I of FIG. 1.

FIG. 1 is a perspective view showing an example of a structure of a non-aqueous electrolyte battery including a battery separator according to an embodiment of the present disclosure. FIG. 2 is a cross-sectional view, taken along the line I-I of FIG. 1, schematically showing an electrode laminate structure of the non-aqueous electrolyte battery.

A non-aqueous electrolyte battery 20 according to this embodiment includes a wound electrode body 10 to which a positive electrode lead 15 and a negative electrode lead 16 are attached, and a film-like exterior member 19 that houses the wound electrode body 10. The non-aqueous electrolyte battery 20 is formed in a flat shape as a whole. The positive electrode lead 15 and the negative electrode lead 16 each have a strip shape and are each led out from the inside of the exterior member 19 to the outside thereof, for example, in the same direction. The positive electrode lead 15 is formed of a metal material such as aluminum (Al) or stainless steel (SUS), and the negative electrode lead 16 is formed of a metal material such as nickel (Ni).

[Exterior Member]

The exterior member 19 is, for example, a laminate film having a structure in which a thermal fusion layer, a metal layer, and an exterior resin layer are laminated in the stated order and bonded to one another by lamination or the like. In the exterior member 19, for example, with the thermal fusion layer being inside, outer edge portions of the layers are brought into intimate contact with one another by fusion or with an adhesive.

The thermal fusion layer is formed of, for example, a polyolefin resin such as polyethylene, polypropylene, modified polyethylene, modified polypropylene, or a copolymer of them. This kind of resin material has low moisture permeability and excellent hermeticity. The metal layer is formed of foil-like or plate-like aluminum, stainless steel, nickel, iron (Fe), or the like. The exterior resin layer may be formed of, for example, the same resin used for the thermal fusion layer or may be formed of polyamide or the like. Accordingly, strength against breakage, penetration, and the like can be enhanced. The exterior member 19 may include different layers other than the thermal fusion layer, the metal layer, and the exterior resin layer.

Between the exterior member 19 and the positive electrode lead 15 and negative electrode lead 16, a contact film 17 for increasing adhesion between the positive electrode lead 15 and negative electrode lead 16 and the inside of the exterior member 19 and preventing the entry of outside air is inserted. The contact film 17 is formed of a material having adhesion to the positive electrode lead 15 and to the negative electrode lead 16. In the case where the positive electrode lead 15 and the negative electrode lead 16 are formed of the metal materials described above, the contact film 17 is formed of, for example, a polyolefin resin such as polyethylene, polypropylene, modified polyethylene, or modified polypropylene.

As shown in FIG. 2, the wound electrode body 10 is formed by laminating a positive electrode 11 and a negative electrode 12 via a separator 13 and an electrolyte layer 14 that is a non-liquid and non-aqueous electrolyte and winding the laminate. A protective tape 18 is attached to the outermost circumferential portion of the wound electrode body 10 so that the wound state is maintained.

[Positive Electrode]

The positive electrode 11 includes a positive electrode current collector 11A and a positive electrode active material layer 11B containing a positive electrode active material. The positive electrode active material layer 11B is formed on both surfaces of the positive electrode current collector 11A. As the positive electrode current collector 11A, for example, metal foils such as an aluminum foil, a nickel foil, and a stainless steel foil can be used.

The positive electrode active material layer 11B contains, for example, the positive electrode active material, a conductive agent, and a binding agent. As the positive electrode active material, a metal oxide, a metal sulfide, or a specific polymer can be used in accordance with the type of target battery. For example, in the case where a lithium-ion battery is formed, a composite oxide formed of lithium (Li) and a transition metal is used. The composite oxide mainly contains $Li_xMO_2$ (where M represents one or more kinds of transition metals, and X varies depending on a charge or discharge state of the battery and normally has a value of 0.05 or more and 1.10 or less). As the transition metals that form the lithium composite oxide, cobalt (Co), nickel, manganese (Mn), and the like are used.

Specific examples of such a lithium composite oxide include $LiCoO_2$, $LiNiO_2$, $LiMn_2O_4$, and $LiNi_yCo_{1-y}O_2$ ($0<y<1$). Further, a solid solution in which a part of a transition metal element is substituted with another element can also be used. Examples of the solid solution include $LiNi_{0.5}Co_{0.5}O_2$ and $LiNi_{0.8}Co_{0.2}O_2$. Those lithium composite oxides can generate a high voltage and are excellent in energy density.

In addition, as the positive electrode active material, a metal sulfide, a metal oxide, and the like that contain no lithium, such as $TiS_2$, $MoS_2$, $NbSe_2$, and $V_2O_5$ may be used. Those positive electrode active materials may be used alone or in combination of various kinds thereof.

Examples of the conductive agent include carbon materials such as graphite, carbon black, acetylene black, and ketjen black. Those materials may be used alone or in combination of various kinds thereof. It should be noted that the conductive agent may be a metal material or a conductive polymer as long as it is formed of a material having conductivity.

Examples of the binding agent include a synthetic rubber such as a styrene-butadiene rubber, a fluoro rubber, an ethylene-propylene-diene rubber, and a polymeric material such as polyvinylidene fluoride. Those materials may be used alone or in combination of various kinds thereof.

The positive electrode 11 includes the positive electrode lead 15, which is connected to an end portion of the positive electrode current collector 11A by spot welding or ultrasonic welding. A metal foil and mesh-like material is desirable for the positive electrode lead 15, but materials that are electrochemically and chemically stable and can establish conduction may be used instead of metal without causing problems.

[Negative Electrode]

The negative electrode 12 includes a negative electrode current collector 12A and a negative electrode active material layer 12B containing a negative electrode active material. The negative electrode active material layer 12B is formed on both surfaces of the negative electrode current collector 12A. As the negative electrode current collector 12A, for example, metal foils such as a copper (Cu) foil, a nickel foil, and a stainless steel foil can be used.

The negative electrode active material layer 12B contains, for example, the negative electrode active material and, as necessary, a conductive agent and a binding agent. As the negative electrode active material, a lithium metal, a lithium alloy, a carbon material capable of being doped/undoped with lithium, or a composite material of a metal material and a carbon material is used. Specifically, examples of the carbon material capable of being doped/undoped with lithium include graphitizable carbon, non-graphitizable carbon having a lattice spacing in (002) surface of 0.37 nm or more, and graphite having a lattice spacing in (002) surface of 0.34 nm or less. More specifically, pyrolytic carbons, cokes, a glass-like carbon fiber, a sintered body of an organic polymer compound, an activated carbon, carbon blacks, and the like are included. Of those, the cokes include a pitch coke, a needle coke, a petroleum coke, and the like. The sintered body of an organic polymer compound refers to one obtained by sintering a phenol resin, a furan resin, and the like at an appropriate temperature to be carbonized. Since a change in crystalline structure that accompanies storage and release of lithium is very small in the carbon material, a high energy density and excellent cycle characteristics are obtained, and the carbon material also functions as a conductive agent. It should be noted that the shape of the carbon material may be any of fiber-like, spherical, granular, and scale-like shapes.

Further, as the material capable of being doped/undoped with lithium, polymers such as polyacetylene and polypyrrole and oxides such as $SnO_2$ can be used.

In addition to the carbon material described above, examples of the negative electrode material capable of storing and releasing lithium include a material that can store and release lithium and also includes at least one kind of metal element and metalloid element as a constituent element. With use of this type of material, a high energy density can be obtained. Such a negative electrode material may be a simple substance, an alloy, or a compound of the metal element or the metalloid element, or may be a material containing, in at least a part thereof, one or two or more kinds of phases of them.

It should be noted that the "alloy" used herein includes, in addition to an alloy constituted of two kinds or more of metal elements, an alloy containing one kind or more of metal elements and one kind or more of metalloid elements. Further, the "alloy" may include a nonmetal element. In the composition of the alloy, a solid solution, an eutectic (eutectic mixture), an intermetallic compound, or two kinds or more of them may coexist.

Examples of the metal element or metalloid element described above include a lithium metal. Further, examples of metal element or metalloid element capable of forming an alloy with lithium include magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt).

As the negative electrode material constituted of the metal element or metalloid element capable of forming an alloy with lithium, a material including as a constituent element at least one kind of metal element and metalloid element of Group 14 in a long-period type periodic table is used. For example, a material including as a constituent element at least one kind of silicon and tin is used. Since this type of material has a large capability of storing and releasing lithium, a high energy density can be obtained.

Examples of the negative electrode material including at least one kind of silicon and tin include a simple substance, an alloy, and a compound of silicon, a simple substance, an alloy, and a compound of tin, and a material containing, in at least a part thereof, one or two or more kinds of phases of them.

Examples of the alloy of silicon include an alloy containing, as a second constituent element other than silicon, at least one kind selected from the group consisting of tin, nickel, copper, iron, cobalt, manganese, zinc, indium, silver, titanium, germanium, bismuth, antimony (Sb), and chromium (Cr). Examples of the compound of silicon include a compound containing oxygen (O) or carbon (C). The compound may contain the second constituent element described above in addition to silicon.

Example of the alloy or compound of silicon include $SiB_2$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $LiSiO$.

Examples of the alloy of tin include an alloy containing, as a second constituent element other than tin, at least one kind selected from the group consisting of silicon, nickel, copper, iron, cobalt, manganese, zinc, bismuth, antimony, and chromium. Examples of the compound of tin include a compound containing oxygen or carbon. The compound may contain the second constituent element described above in addition to tin. Examples of the alloy or compound of tin include $SnO_w$ ($0<w\leq2$), $SnSiO_3$, $LiSnO$, and $Mg_2Sn$.

[Separator]

Figure 3:
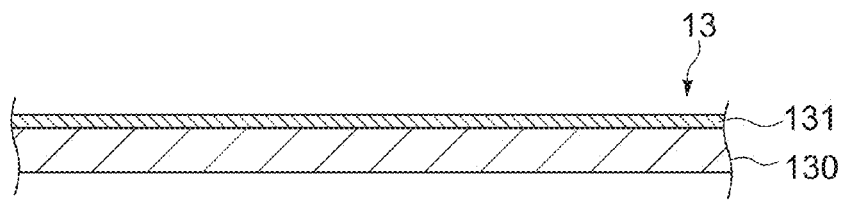
FIG. 3 is a schematic cross-sectional view showing an example of the structure of the battery separator.
Figure 4:
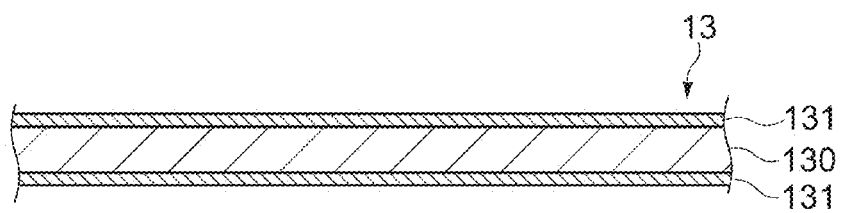
FIG. 4 is a schematic cross-sectional view showing another example of the structure of the battery separator.

FIGS. 3 and 4 are schematic cross-sectional views each showing an example of a structure of the separator 13. The separator 13 shown in FIG. 3 includes a base material 130 and a heat-resistant layer 131. The separator 13 isolates the positive electrode 11 and the negative electrode 12 from each other in a battery and passes ions therethrough while preventing short circuit of current due to contact of both the electrodes.

When being arranged in a battery, the separator 13 is disposed such that the heat-resistant layer 131 is opposed to at least the positive electrode, that is, at least the heat-resistant layer 131 is positioned between the positive electrode 11 and the base material 130. With this structure, the separator 13 can be protected from an oxidizing environment and a high-temperature environment around the positive electrode at a time of a high charge voltage.

In the non-aqueous electrolyte battery 20 of this embodiment, when the non-aqueous electrolyte battery 20 is recharged, for example, lithium ions are released from the positive electrode 11 and stored in the negative electrode 12 via a non-aqueous electrolyte solution impregnated in the separator 13. On the other hand, when the non-aqueous electrolyte battery 20 is discharged, for example, lithium ions are released from the negative electrode 12 and stored in the positive electrode 11 via the non-aqueous electrolyte solution impregnated in the separator 13.

[Base Material]

The base material 130 is formed of a heat-resistant microporous substance having excellent strength. For the base material 130, an insulating resin material having a large ion permeation rate and a predetermined mechanical strength is typically used. Examples of such a resin material include polyolefin-based synthetic resins such as polypropylene (PP) and polyethylene (PE), acrylic resins, styrene resins, polyester resins, and polyamide-based resins. In particular, polyethylene such as low-density polyethylene (LDPE), high-density polyethylene (HDPE), and linear polyethylene, a low molecular weight wax of them, or a polyolefin-based resin such as polypropylene is appropriate in terms of a melting temperature and easily available. Further, a laminate structure of two kinds or more of those porous membranes or a porous membrane formed by fusing and kneading two kinds or more of resin materials may be adopted. A material containing a polyolefin-based porous membrane has excellent isolation performance between the positive electrode 11 and the negative electrode 12 and can further reduce internal short circuit and a lowering of an open-circuit voltage.

A thickness of the base material 130 can be arbitrarily set as long as a necessary strength can be maintained with such a thickness. The base material 130 is set to have a thickness with which the positive electrode 11 and the negative electrode 12 are isolated from each other, short circuit and the like are prevented from occurring, ion permeability for suitably performing a battery reaction via the separator 13 is obtained, and a volumetric efficiency of an active material layer that contributes to a battery reaction in the battery can be increased as much as possible. For example, the thickness of the base material 130 is set to 5 µm or more and 20 µm or less.

[Heat-Resistant Layer]

The heat-resistant layer 131 is formed on at least one surface of the base material 130. The separator 13 shown in FIG. 3 is an example in which the heat-resistant layer 131 is formed on a first surface (upper surface in FIG. 3) of the base material 130, and the separator 13 shown in FIG. 4 is an example in which the heat-resistant layer 131 is formed on each of the first surface of the base material 130 and a second surface (lower surface in FIG. 4) opposed to the first surface. The heat-resistant layer 131 is for suppressing shrink of the base material 130 due to heat while maintaining an excellent shutdown function of the separator 13.

The heat-resistant layer 131 is formed of an inorganic material layer having heat resistance higher than that of a material constituting the base material 130. Examples of such an inorganic material include an aluminum oxide, a silicon oxide, and a titanium oxide. In this embodiment, an aluminum oxide is used.

The heat-resistant layer 131 is formed not only on a main surface (one surface or both surfaces) of the base material 130 but also inside the base material 130. As described above, the base material 130 is formed of a microporous material and has a plurality of minute holes thereinside. Those holes are not only formed in a plane of the base material 130 (both surfaces thereof) but also continuously formed in a thickness direction thereof such that one surface of the base material 130 can communicate with the other surface. The heat-resistant layer 131 is formed not only on the main surface of the base material 130 but also on the surface of each hole.

Figure 5:
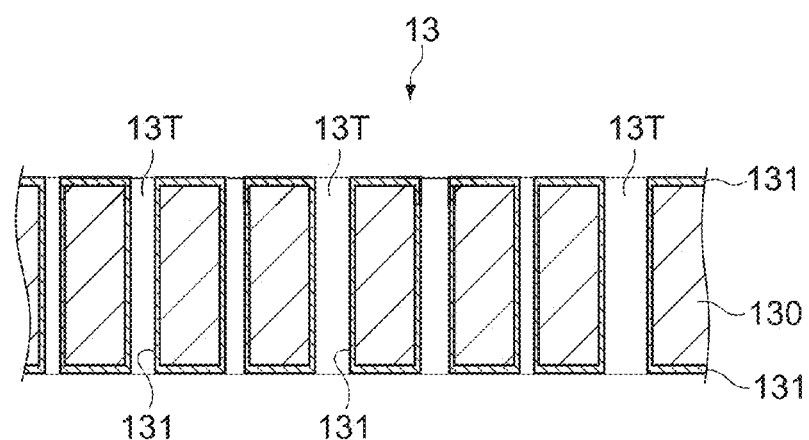
FIG. 5 is a schematic cross-sectional view for describing an internal structure of the battery separator shown in FIG. 4.

FIG. 5 is a cross-sectional view schematically showing an internal structure of the separator 13. Inside the base material 130, a plurality of passages 13T that cause the upper surface of the base material 130 and the lower surface thereof to communicate with each other are formed. As described above, the base material 130 incorporates a plurality of minute holes. The passages 13T are formed by the holes within the base material 130 being connected in the thickness direction. It should be noted that for simple description, the passages 13T are illustrated as linear passages in FIG. 5.

An inner wall surface of each passage 13T is covered with the heat-resistant layer 131. The heat-resistant layer 131 that covers the passages 13T is formed simultaneously with the heat-resistant layer 131 that covers the main surface of the base material 130. In other words, the heat-resistant layer 131 is formed on the main surface of the base material 130 and the surface of each inner hole without clogging the passages 13T (holes). Here, the hole of the base material 130 has an inner diameter of 50 nm or more and 100 nm or less, for example. The heat-resistant layer 131 is formed on the surfaces of the holes having such an inner diameter without clogging the holes.

The formation of the heat-resistant layer 131 on the surfaces of the passages 13T can improve heat resistance of the separator 13 as compared to the case where the heat-resistant layer 131 is formed only on the main surface of the base material 130. Further, the formation of the heat-resistant layer 131 on the surfaces of the passages 13T can enhance affinity of an electrolyte solution with respect to the passages 13T.

A thickness of the heat-resistant layer 131 is 2 nm or more and 10 nm or less, for example. In the case where the thickness is less than 2 nm, target heat resistance of the separator 13 is difficult to be obtained. On the other hand, when the thickness is larger than 10 nm, heat resistance is excessively raised and therefore it becomes difficult to stably ensure a predetermined shutdown function of the base material 130. Further, the openings of the passages 13T are narrowed and air resistance is significantly increased.

Figures 6, 7:
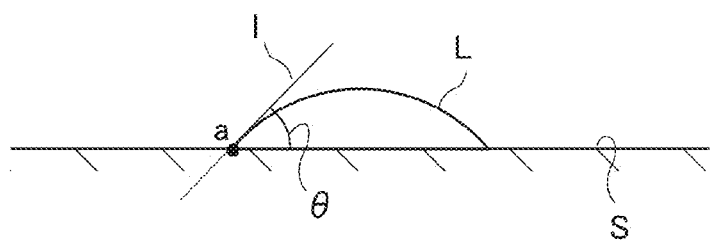
FIG. 6 is a table of experiment results showing a relationship among a thickness of a heat-resistant layer, air resistance, and a contact angle with respect to dimethyl carbonate (DMC)
FIG. 7 is a diagram for describing the contact angle.

FIG. 6 is a table of experiment results showing a relationship among a thickness of the heat-resistant layer, air resistance (Gurley) of the separator, and wettability. Here, the separator 13 having the structure shown in FIG. 3 was produced. For the base material 130, polyethylene (PE) having a thickness of 16 µm and air resistance of 300 [s/100 ml] was used. A temperature at which the holes are clogged due to self-contract of the base material (shutdown temperature) is generally about 100 to 150° C., though it depends on the quality of the base material. For the heat-resistant layer 131, an aluminum oxide was used.

The wettability was represented by a contact angle (degree) between the surface of the separator 13 and dimethyl carbonate (DMC). The contact angle was defined as an angle θ formed, after a droplet L of DMC is formed on a surface S of the separator as shown in FIG. 7, between the surface S and a tangent line 1 of a circle at a point a. Here, the point a represents a contact point between the droplet L and the surface S.

As shown in FIG. 6, as compared to a sample 1 formed of only a base material having no heat-resistant layer, samples 2 to 4 each having a heat-resistant layer have a small contact angle with respect to DMC, which is measurement limit or less, and also have high wettability. This results from physical properties as to whether the contact surface of the separator with DMC is the base material or the heat-resistant layer. In the separator of the non-aqueous electrolyte battery in which an electrolyte solvent contains DMC, higher affinity with DMC is more desirable, with which ion permeability is enhanced and battery characteristics can be improved.

On the other hand, it was found that the air resistance is reduced as the thickness of the heat-resistant layer is increased, and the air resistance has a value of 2,000 or more at a thickness of 20 nm (sample 4). The air resistance used herein means a time required for air of 100 ml to pass. A smaller value of the air resistance of the separator is more desirable. For example, the thickness of the heat-resistant layer to set the air resistance to 1,000 [s/100 ml] or less is 18 nm or less, and the thickness of the heat-resistant layer to set the air resistance to 600 [s/100 ml] or less is 15 nm or less.

Figure 8:
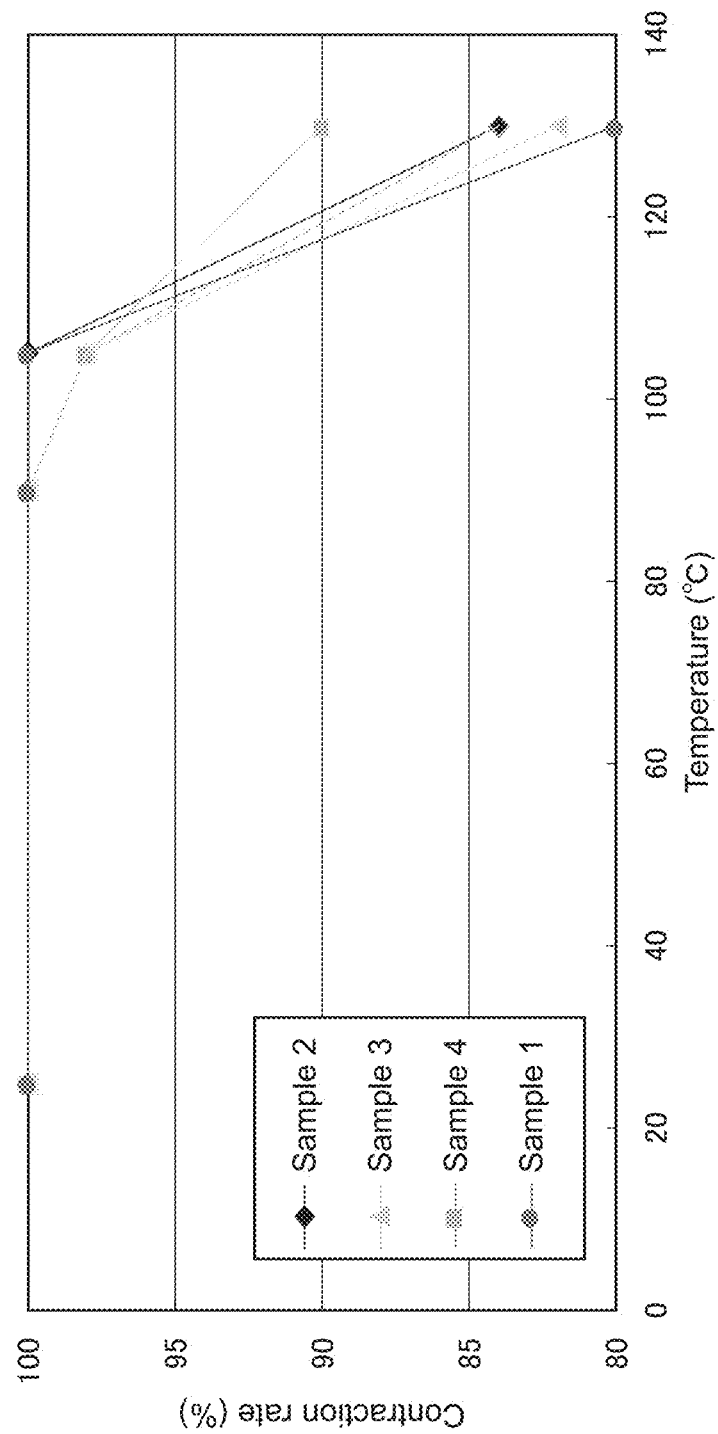
FIG. 8 is a graph showing experiment results obtained by evaluating heat-resistance characteristics of samples shown in FIG. 6.
Figure 9:
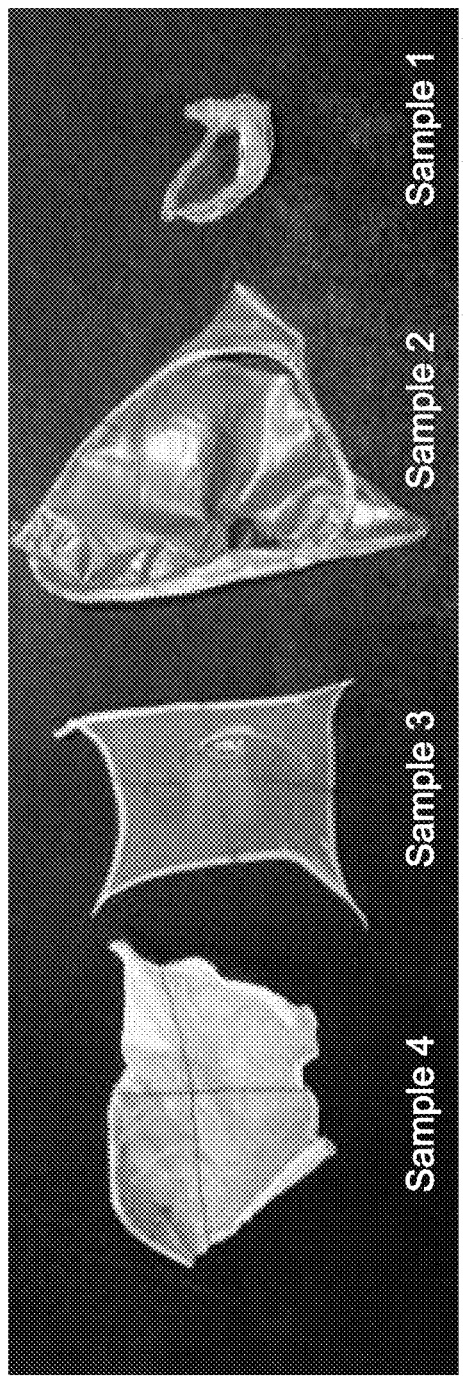
FIG. 9 is a view showing forms of the samples after the heat-resistance evaluation.

FIGS. 8 and 9 show experiment results showing heat resistance of the samples 1 to 4. FIG. 8 shows contraction rates of length, in an arbitrary direction, of the samples formed in a rectangular shape, obtained after the samples are held at temperatures of 90° C., 105° C., and 130° C. for one hour. The contraction rate used herein means a relative value when a dimension of a sample at room temperature is assumed to be 100(%). Meanwhile, FIG. 9 shows states of the samples after being held at 150° C. for one hour.

As shown in FIG. 8, contraction of the samples was found at the temperature of 130° C. In particular, a contraction amount of the sample 1 having no heat-resistant layer was large, and as shown in FIG. 9, the sample 1 hardly retained its original shape at the temperature of 150° C. On the other hand, in each of the samples 2 to 4 having a heat-resistant layer, a contraction amount was small as compared to the sample 1. As shown in FIG. 9, it was found that although the contraction forms are different, as the thickness of the heat-resistant layer is larger, contraction is less caused and higher heat resistance is obtained. It is obvious that use of a sample in which a heat-resistant layer is formed on both surfaces of the base material as shown in FIG. 4, instead of the structure of FIG. 3, can reduce thermal contraction more than the experiment results described above.

Further, as shown in FIG. 9, while the samples 2 and 3 are translucent as a whole, the sample 4 is whitish as a whole. This means that the holes of the base material are clogged in the samples 2 and 3, and the holes of the base material are not yet clogged in the sample 4. In other words, this implies that the predetermined shutdown function of the samples 2 and 3 works effectively, and conversely the shutdown function of the sample 4 does not work effectively. This is considered because in this example, the thickness of the heat-resistant layer of the sample 4 is 20 nm, which is large, and a clogging operation of the holes by heat is inhibited.

Further, although not shown in the figures, the thickness of the heat-resistant layer 131 that covers one surface of the base material 130, the other surface thereof, and the surfaces of the holes may be almost uniform or different from one another. In the case where the thickness is different, for example, the thickness of the heat-resistant layer 131 that covers the surface of the base material 130 may be larger than that of the heat-resistant layer 131 that covers the surfaces of the holes.

Furthermore, the heat-resistant layer 131 that covers the surfaces of the holes may be formed in an almost uniform thickness or may have a distribution of thickness. For example, as a distance from the surface (both surfaces) of the base material 130 is increased in each hole, the thickness of the heat-resistant layer 131 may be gradually reduced. Alternatively, in the heat-resistant layer 131 that covers the surfaces of the holes, the thickness of the heat-resistant layer 131 formed at the center in the thickness direction of the separator 13 (base material 130) may be smaller than that of other portions. With this structure, spaces are generated in the holes of the separator 13, with the result that air resistance can be reduced (a degree of penetration of the electrolyte solution is increased) while heat resistance is ensured.

[Non-Aqueous Electrolyte]

The electrolyte layer 14 contains a non-aqueous electrolyte solution and a polymer compound holding the non-aqueous electrolyte solution and is in a so-called gel state. The non-aqueous electrolyte solution contains an electrolyte salt and a solvent that dissolves the electrolyte salt. Examples of the electrolyte salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). For the electrolyte salt, any one kind of them may be used, or two or more kinds of them may be used in combination.

Examples of the solvent include the following non-aqueous solvents: lactone-based solvents such as γ-butyrolactone, γ-valerolactone, δ-valerolactone, and ε-caprolactone; ester carbonate-based solvents such as ethylene carbonate (EC), propylene carbonate (PC), butylene carbonate (BC), vinylene carbonate (VC), dimethyl carbonate (DMC), ethyl methyl carbonate (EMC), and diethyl carbonate (DEC); ether-based solvents such as 1,2-dimethoxyethane, 1-ethoxy-2-methoxyethane, 1,2-diethoxyethane, tetrahydrofuran, and 2-methyltetrahydrofuran; nitrile-based solvents such as acetonitrile; sulfolane-based solvents; phosphoric acids; phosphate ester solvents; and pyrrolidones. For the solvent, any one kind of them may be used alone or two or more kinds of them may be used in combination.

Further, it is desirable for the solvent to contain a compound in which a part or all of hydrogen of a cyclic ester or a chained ester is fluorinated. As the fluorinated compound, it is desirable to use difluoroethylene carbonate (4,5-difluoro-1,3-dioxolane-2-one). This is because, even when the negative electrode 12 containing a compound of silicon, tin, germanium, or the like is used as the negative electrode active material, charge-discharge cycle characteristics can be improved, and difluoroethylene carbonate is particularly excellent in the effect of improving cycle characteristics.

The polymer compound may be any compound that absorbs a solvent and turns the solvent into a gel. Examples of the polymer compound include fluorine-based polymer compounds such as a copolymer of polyvinylidene fluoride (PVdF) or vinylidene fluoride (VdF) and hexafluoropropylene (HFP), an ether-based polymer compound such as a polyethylene oxide (PEO) or a cross-linker containing a polyethylene oxide (PEO), and a polymer compound containing polyacrylonitrile (PAN), a polypropylene oxide (PPO), or polymethylmethacrylate (PMMA) as a repeating unit. For the polymer compound, any one kind of them may be used alone, or two or more kinds of them may be used in combination.

In particular, it is desirable to use a fluorine-based polymer compound from the viewpoint of redox stability, and it is more desirable to use a copolymer containing vinylidene fluoride (VdF) and hexafluoropropylene (HFP) as its components. Further, the copolymer described above may contain, as its components, an unsaturated dibasic acid monoester such as monomethyl maleate (MME), a halogenated ethylene such as chlorotrifluoroethylene (PTCFE), a cyclic carbonate of an unsaturated compound such as vinylene carbonate (VC), an epoxy group-containing acrylic vinyl monomer, and the like. This is because higher characteristics can be obtained.

[Method of Manufacturing Non-Aqueous Electrolyte Battery]

[Method of Manufacturing Positive Electrode]

The positive electrode 11 is manufactured as follows. A positive electrode active material, a binding agent, and a conductive agent are first mixed to prepare a positive electrode mixture. The positive electrode mixture is dispersed in a solvent of N-methyl-2-pyrrolidone or the like to prepare a mixed solution. Then, the positive electrode mixture slurry thus prepared is applied to the positive electrode current collector 11A and dried, and then compression-molded with a roll press machine or the like to form the positive electrode active material layer 11B, thus obtaining a positive electrode 11.

[Method of Manufacturing Negative Electrode]

The negative electrode 12 is manufactured as follows. A negative electrode active material and a binding agent are first mixed to prepare a negative electrode mixture. The negative electrode mixture is dispersed in a solvent of N-methyl-2- pyrrolidone or the like to obtain a negative electrode mixture slurry. Then, the negative electrode mixture slurry is applied to the negative electrode current collector 12A and the solvent is dried, and then compression-molded with a roll press machine or the like to form the negative electrode active material layer 12B, thus obtaining a negative electrode 12.

Further, in the case where a metal- or alloy-based negative electrode is used, a gas phase method, a liquid phase method, a thermal spraying method, a calcination method, and the like can be used. Furthermore, in the case where two kinds or more of those methods are used, it is desirable for the negative electrode current collector 12A and the negative electrode active material layer 12B to be alloyed in at least a part of an interface therebetween. Specifically, it is desirable that in the interface, a constituent element of the negative electrode current collector 12A be dispersed in the negative electrode active material layer 12B, a constituent element of the negative electrode active material layer 12B be dispersed in the negative electrode current collector 12A, or those constituent elements be mutually dispersed. Accordingly, breaking of the negative electrode active material layer 12B due to expansion and contraction accompanying the charge and discharge can be suppressed, and electron conductivity between the negative electrode active material layer 12B and the negative electrode current collector 12A can be improved.

It should be noted that examples of the gas phase method include physical vapor deposition and chemical vapor deposition, specifically vacuum deposition, sputtering, ion plating, laser ablation, thermal chemical vapor deposition (CVD), and plasma CVD. As the liquid phase method, known techniques such as electroplating and electroless plating can be used. For example, the calcination method is a method of applying a granular negative electrode active material mixed with a binding agent or the like and dispersed in the solvent, and then performing heat treatment at a temperature higher than a melting point of the binding agent or the like. A known method can also be used regarding the calcination method, and for example, an atmospheric calcination method, a reactive calcination method, or a hot press calcination method may be used.

[Method of Manufacturing Separator]

The separator 13 is manufactured by forming the heat-resistant layer 131 on one surface or both surfaces of the base material 130. The heat-resistant layer 131 is deposited by an atomic layer deposition method (hereinafter, also referred to as ALD method). The ALD method is a thin-film forming method in which a plurality of kinds of source gases (precursor gases) are alternately introduced into a chamber so that a reaction product is deposited as an atomic layer one by one on the surface of a base material. Accordingly, the heat-resistant layer 131 can be formed not only on the main surface of the base material 130 but also on the surfaces of the holes (inner wall surfaces of the passages 13T) formed in the base material 130 (FIG. 5).

[Method of Depositing Heat-Resistant Layer]

In the ALD method, a method of forming plasma in a chamber (plasma ALD method), a method of heating a base material (thermal ALD method), and the like to promote a reaction of the source gases are known, and any method of them can be applied. In this embodiment, however, the thermal ALD method is adopted.

In the case where the heat-resistant layer 131 is formed of an aluminum oxide film, a first precursor gas and a second precursor gas are used. Examples of the first precursor gas include TMA (trimethylaluminium; $(CH_3)_3Al$). Examples of the second precursor gas include water ($H_2O$).

It should be noted that in addition to the above materials, the following materials can be used as the first and second precursor gases, for example: bis(tert-butylimino)bis(dimethylamino)tungsten (VI); $((CH_3)_3CN)_2W(N(CH_3)_2)_2$, tris (tert-butoxy)silanol; $((CH_3)_3CO)_3SiOH$, diethylzinc; $(C_2H_5)_2$ Zn, tris(diethylamido)(tert-butylimido)tantalum (V); $(CH_3)_3$ $CNTa(N(C_2H_5)_2)_3$, tris(tert-pentoxy)silanol; $(CH_3CH_2C(CH_3)_2O)_3SiOH$, trimethyl(methylcyclopentadienyl)platinum (IV); $C_5H_4CH_3Pt(CH_3)_3$, bis(ethylcyclopentadienyl)ruthenium (II); $C_7H_9RuC_7H_9$, (3-aminopropyl)triethoxysilane; $H_2N(CH_2)_3Si(OC_2H_5)_3$, silicon tetrachloride; $SiCl_4$, titanium tetrachloride; $TiCl_4$, titanium (IV) isopropoxide; $Ti[(OCH)(CH_3)_2]_4$, tetrakis(dimethylamido)titanium (IV); $[(CH_3)_2N]_4Ti$, tetrakis(dimethylamido)zirconium (IV); $[(CH_3)_2N]_4Zr$, tris [N,N-bis(trimethylsilyl)amide]yttrium; and $[[(CH_3)_3Si]_2]N)_3Y$.

FIG. 10 are process diagrams for describing a method of depositing an ALD layer. Here, a method of depositing an ALD layer 34 will be described with an example of batch treatment. However, deposition treatment in a roll-to-roll system can also be applied as described later.

As shown in FIGS. 10A to 10D, a porous base material film 35 is sequentially exposed to a first precursor gas 36A, a purge gas 36P, a second precursor gas 36B, and the purge gas 36P, to thereby form an aluminum oxide monolayer 34C. The base material film 35 corresponds to the base material 130 shown in FIG. 3 or 4. The base material film 35 is heated to a predetermined temperature at a time of deposition. The predetermined temperature is set to a lower temperature than a shutdown temperature of the base material film 35.

Figure 10A:
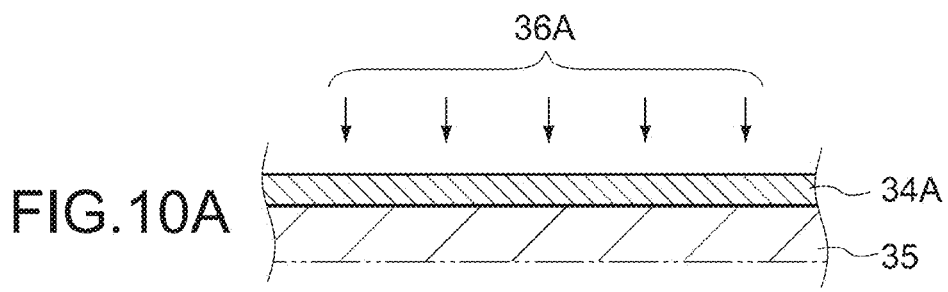
FIGS. 10A to 10D are schematic process diagrams for describing a method of forming a heat-resistant layer.

The base material film 35 is brought in the chamber evacuated to a predetermined pressure. As shown in FIG. 10A, the first precursor gas 36A introduced into the chamber is adsorbed on the surface of the base material film 35 so that a first precursor layer 34A formed of the precursor gas 36A is formed on the surface of the base material film 35.

Figure 10B:
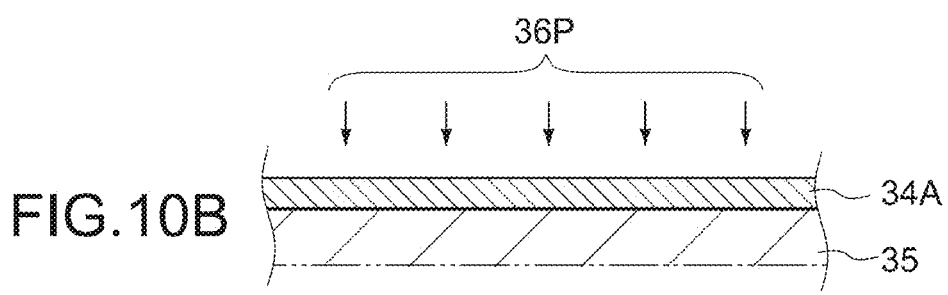

Then, as shown in FIG. 10B, the purge gas 36P is introduced into the chamber. Accordingly, the surface of the base material film 35 is exposed to the purge gas 36P, and the unattached precursor gas 36A remaining on the surface of the base material film 35 is removed. As the purge gas 36P, for example, argon (Ar) is used in the case where a thin film of an aluminum oxide is formed. In addition to argon, for example, nitrogen, hydrogen, oxygen, carbon dioxide, and the like can be used as a purge gas.

Figure 10C:
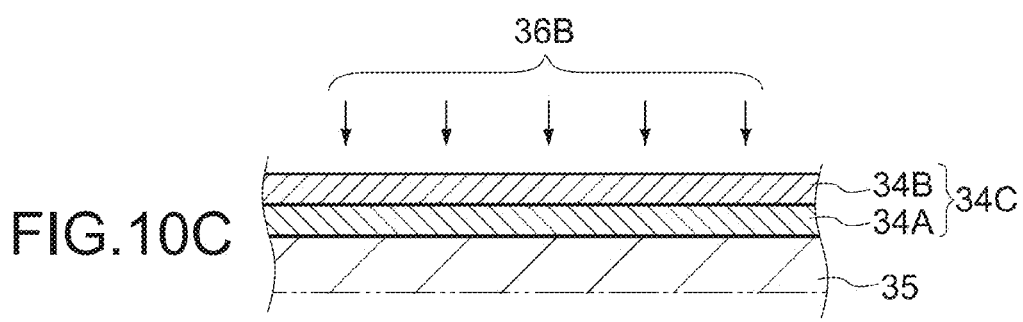
Figure 10D:
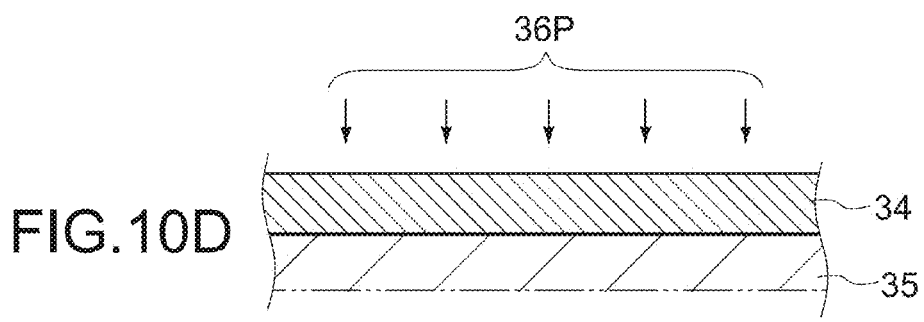

Subsequently, as shown in FIG. 10C, the second precursor gas 36B is introduced into the chamber. The second precursor gas 36B is adsorbed on the surface of the base material film 35 to thereby form a second precursor layer 34B formed of the precursor gas 36B on the first precursor layer 34A. As a result, an aluminum oxide monolayer 34C is formed by a chemical reaction between the first precursor layer 34A and the second precursor layer 34B. After that, as shown in FIG. 10D, the purge gas 36P is introduced into the chamber again, and the unattached precursor gas 36B remaining on the surface of the base material film 35 is removed.

By repetition of the above treatment, an ALD layer 34 having a predetermined thickness is formed on the surface of the base material film 35. The ALD layer 34 corresponds to the heat-resistant layer 131 shown in FIG. 3 or 4. The heat-resistant layer 131 is formed not only on the surface of the base material 130 but also on the surfaces of the holes (passages 13T) as shown in FIG. 5.

[Deposition Apparatus for Heat-Resistant Layer]

Figure 11:
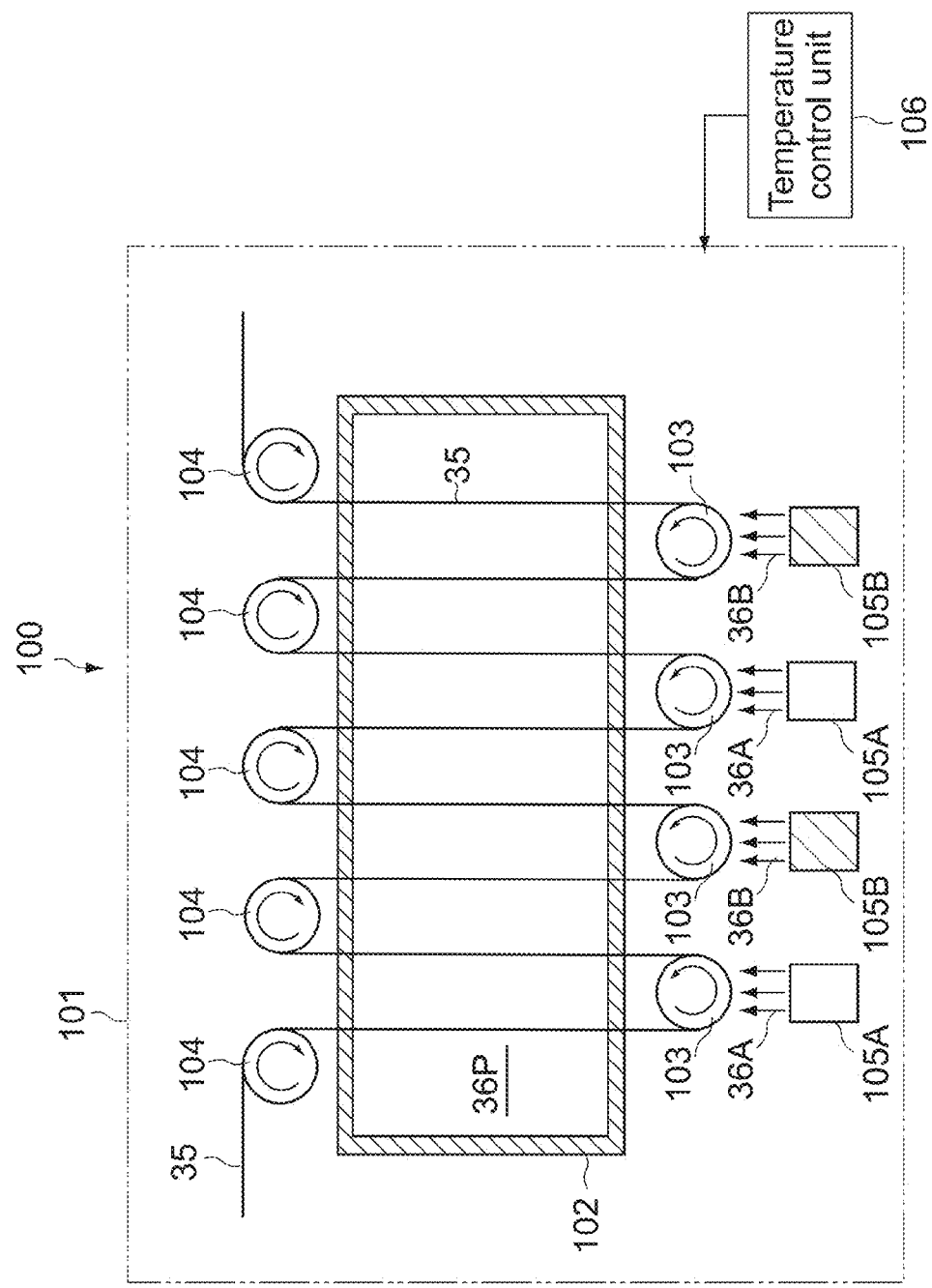
FIG. 11 is a schematic view showing an example of a structure of a deposition apparatus for a heat-resistant layer.

FIG. 11 is a cross-sectional view schematically showing an example of a deposition apparatus for forming the heat-resistant layer 131 by the roll-to-roll system. This deposition apparatus 100 is constituted as an apparatus for manufacturing a separator in which a heat-resistant layer is formed on one surface of a base material as shown in FIG. 3.

The deposition apparatus 100 includes a vacuum chamber 101 evacuated to a predetermined pressure, an inner chamber 102 filled with the purge gas 36P, and a transfer mechanism for transferring the base material film 35 that constitutes the base material 130 in the vacuum chamber 101. The deposition apparatus 100 additionally includes ALD heads 105A and 105B and a temperature control unit 106. The ALD heads 105A and 105B discharge the precursor gases 36A and 36B to the surface of the base material film 35 transferred inside the vacuum chamber 101. The temperature control unit 106 is installed in the outside of the vacuum chamber 101.

The transfer mechanism includes a pay-out roller that pays out the base material film 35, a take-up roller that takes up the base material film 35, and a plurality of guide rolls 103 and 104 installed between the pay-out roller and the take-up roller. The plurality of guide rolls 103 and the plurality of guide rolls 104 are arrayed in the outside of the opposed sidewall portions of the inner chamber 102. The base material film 35 is transferred while being alternately guided by the guide rolls 103 and the guide rolls 104. In this example, both the guide rolls 103 and 104 are arranged such that the front surface (deposition surface) of the base material film 35 comes into contact with the guide rolls 103, and the rear surface (non-deposition surface) of the base material film 35 comes into contact with the guide rolls 104. Further, the guide rolls 103 and 104 are each configured such that its surface temperature can be adjusted in accordance with a command from the temperature control unit 106. Accordingly, the base material film 35 is maintained at a predetermined deposition temperature.

Meanwhile, a plurality of slots are formed on both the sidewall portions of the inner chamber 102. The base material film 35 can pass through the plurality of slots. Those slots are formed in areas through which the base material film 35 linearly extending between the guide rolls 103 and the guide rolls 104 passes. This allows the entrance and exit of the base material film 35 to and from the inner chamber 102 each time the base material film 35 passes through between the guide rolls 103 and the guide rolls 104.

The ALD heads 105A and 105B are arranged so as to face the respective guide rolls 103 and discharge the precursor gases 36A and 36B toward the surface of the base material film 35 on the guide rolls 103. The ALD heads 105A discharge the first precursor gas 36A, and the other ALD heads 105B discharge the second precursor gas 36B. In this example, the ALD heads 105A and 105B are alternately arranged along the transfer direction of the base material film 35 so as to face the guide rolls 103.

It should be noted that the deposition apparatus 100 additionally includes an exhaust line for exhausting air from the vacuum chamber 101, a purge gas introduction line for supplying the purge gas 36P to the inner chamber 102, a precursor gas introduction line for supplying the precursor gases to the ALD heads 105A and 105B, and the like, though not shown in the figure.

In the deposition apparatus 100 structured as described above, as shown in FIG. 11, the base material film 35 is sequentially transferred to the positions of the ALD heads 105A and 105B by the transfer mechanism constituted of the guide rolls 103 and 104 and the like. The base material film 35 is exposed to the first precursor gas 36A discharged from the ALD head 105A (FIG. 10A) and then exposed to the purge gas 36P in the inner chamber 102 (FIG. 10B). Subsequently, the base material film 35 is exposed to the second precursor gas 36B discharged from the ALD head 105B (FIG. 10C) and then exposed to the purge gas 36P in the inner chamber 102 (FIG. 10D). Such treatment is sequentially repeated so that an ALD layer 34 is formed on the surface of the base material film 35.

An amount, an exposure time, and the like of the precursor gases 36A and 36B and the purge gas 36P, to which the base material film 35 is exposed, are adjusted based on a transfer speed of the base material film 35, an amount of the gas discharged from the ALD heads 105A and 105B, the size of the inner chamber 102, and the like.

In such a manner, the separator 13 shown in FIG. 3 is manufactured. Since the heat-resistant layer 131 is formed by the ALD method in this embodiment, a dense film with high coverage performance can be obtained. Therefore, according to the separator 13 of this embodiment, the heat-resistant layer 131 can be formed not only on the main surface of the porous base material 130 but also on the surfaces of the minute holes within the base material without clogging the holes. Accordingly, a separator 13 having excellent heat resistance can be obtained.

Further, the heat-resistant layer 131 is formed in a thickness of 2 nm or more and 10 nm or less, and accordingly heat resistance can be improved while a predetermined shutdown function of the separator 13 is ensured.

Figure 12:
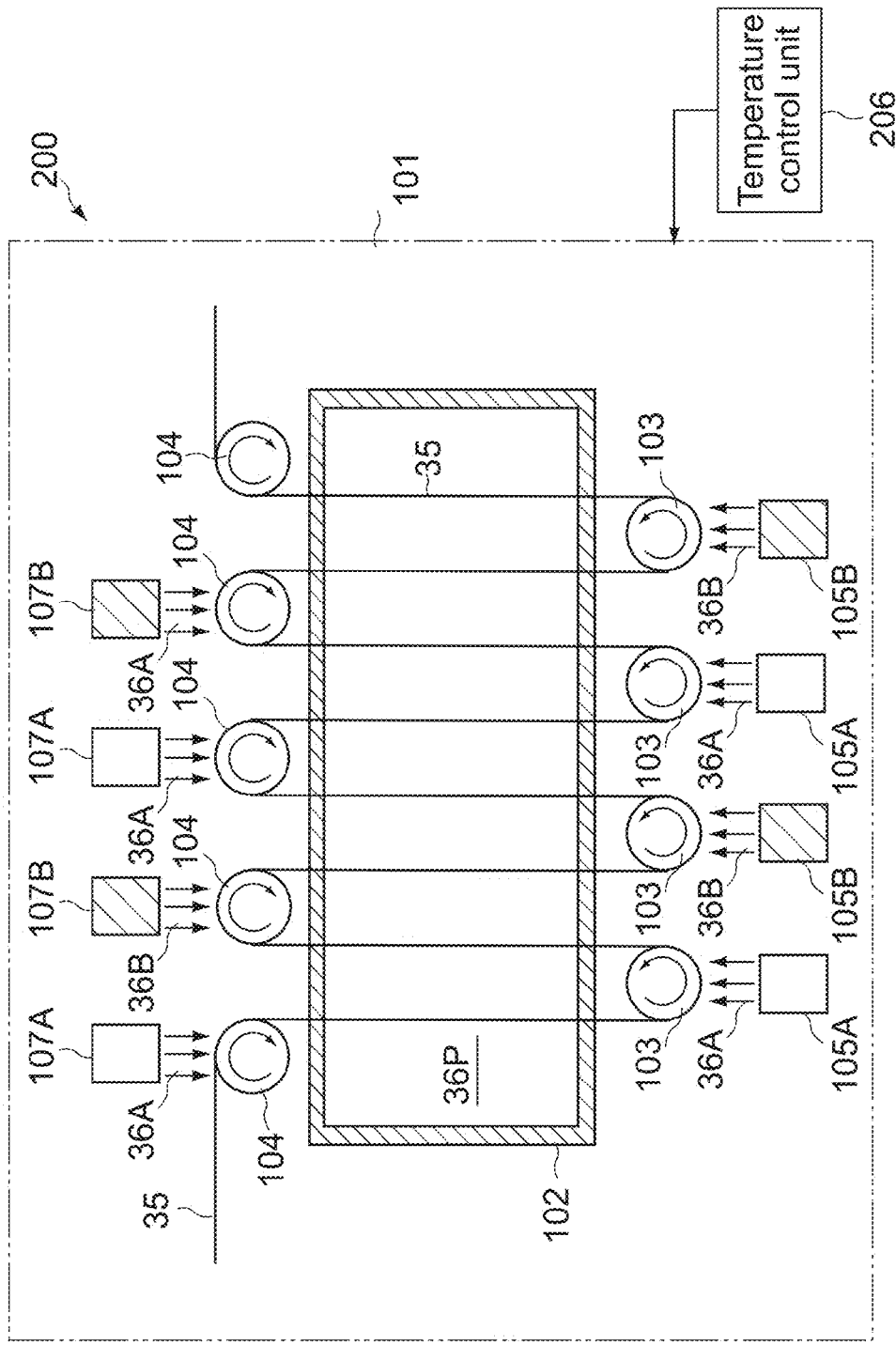
FIG. 12 is a schematic view showing another example of the structure of the deposition apparatus for a heat-resistant layer.

Meanwhile, FIG. 12 is a cross-sectional view schematically showing an example of a deposition apparatus for forming the heat-resistant layer 131 by the roll-to-roll system. This deposition apparatus 200 is constituted as an apparatus for manufacturing a separator in which a heat-resistant layer is formed on both surfaces of a base material as shown in FIG. 4.

The deposition apparatus 200 shown in FIG. 12 has a structure in which a plurality of second ALD heads 107A and 107B are added to the deposition apparatus 100 shown in FIG. 11. Those ALD heads 107A and 107B are arranged so as to face the respective guide rolls 104 and discharge the precursor gases 36A and 36B toward the rear surface of the base material film 35 supported by the respective guide rolls 104. The ALD heads 107A discharge the first precursor gas 36A, and the other ALD heads 107B discharge the second precursor gas 36B. Those ALD heads 107A and 107B are alternately arranged along the transfer direction of the base material film 35 so as to face the respective guide rolls 104.

The base material film 35 faces the ALD heads 105A and 105B on its front surface side when being guided by the guide rolls 103 and faces the ALD heads 107A and 107B on its rear surface side when being guided by the guide rolls 104. Accordingly, an ALD layer (heat-resistant layer 131) is alternately formed on the front and rear surfaces of the base material film 35.

[Method of Assembling Non-Aqueous Electrolyte Battery]

A precursor solution containing a non-aqueous solvent, an electrolyte salt, and as necessary, a solvent is first prepared. The precursor solution is applied to the surface of each of the positive electrode 11 and the negative electrode 12, and then the solvent is vaporized to form a gel-like electrolyte layer 14. Subsequently, the positive electrode lead 15 and the negative electrode lead 16 are attached to the positive electrode current collector 11A and the negative electrode current collector 12A, respectively. Here, the positive electrode lead 15 and the negative electrode lead 16 may be attached to the positive electrode current collector 11A and the negative electrode current collector 12A, respectively, before the electrolyte layer 14 is formed.

Subsequently, the positive electrode 11 and the negative electrode 12, on each of which the electrolyte layer 14 is formed, are laminated via the separator 13 and wound in the longitudinal direction, and a protective tape is bonded to the outermost circumferential portion of the laminate, to thereby form a wound electrode body 10. The wound electrode body 10 can be continuously produced by the roll-to-roll system, for example. For the separator 13, the structure shown in FIG. 3 may be used or the structure shown in FIG. 4 may be used.

Lastly, after the wound electrode body 10 is interposed between two film-like exterior members, for example, the exterior members are bonded to each other at their outer edge portions by thermal fusion bonding or the like and sealed under reduced pressure, to thereby enclose the wound electrode body 10. At this time, the contact film 17 is inserted between the positive electrode lead 15 and negative electrode lead 16 and the exterior members. Thus, the non-aqueous electrolyte battery 20 is produced.

Second Embodiment

The non-aqueous electrolyte battery 20 structured as described above is mounted to, for example, an electronic apparatus, an electric vehicle, and equipment such as an electric storage apparatus or can be used for supplying power.

Examples of electronic apparatuses include a laptop personal computer, a PDA (personal digital assistant), a mobile phone, a cordless handset, a video camera, a digital still camera, a digital book, an electronic dictionary, a music player, a radio, a headphone, a game machine, a navigation system, a memory card, a pacemaker, a hearing aid, an electric tool, an electric shaver, a refrigerator, an air conditioner, a television set, a stereo, a water heater, a microwave, a dishwasher, a washing machine, a dryer, lighting equipment, a toy, medical equipment, a robot, a load conditioner, and a traffic light. In this case, examples of power receiving circuits to which power is supplied from the non-aqueous electrolyte battery 20 include an IC component, various electric/electronic components such as light emitting components, a circuit board on which those components are mounted, and an actuator such as a motor.

Examples of electric vehicles include a railroad vehicle, a golf cart, an electric cart, and an electric automobile (including hybrid car). The non-aqueous electrolyte battery 20 is used as a driving power source or an auxiliary power source for those vehicles.

Examples of electric storage apparatuses include an electric-power storage power supply for buildings including houses or for electric power generation facilities.

Hereinafter, a battery pack will be described as a typical example.

Figure 13:
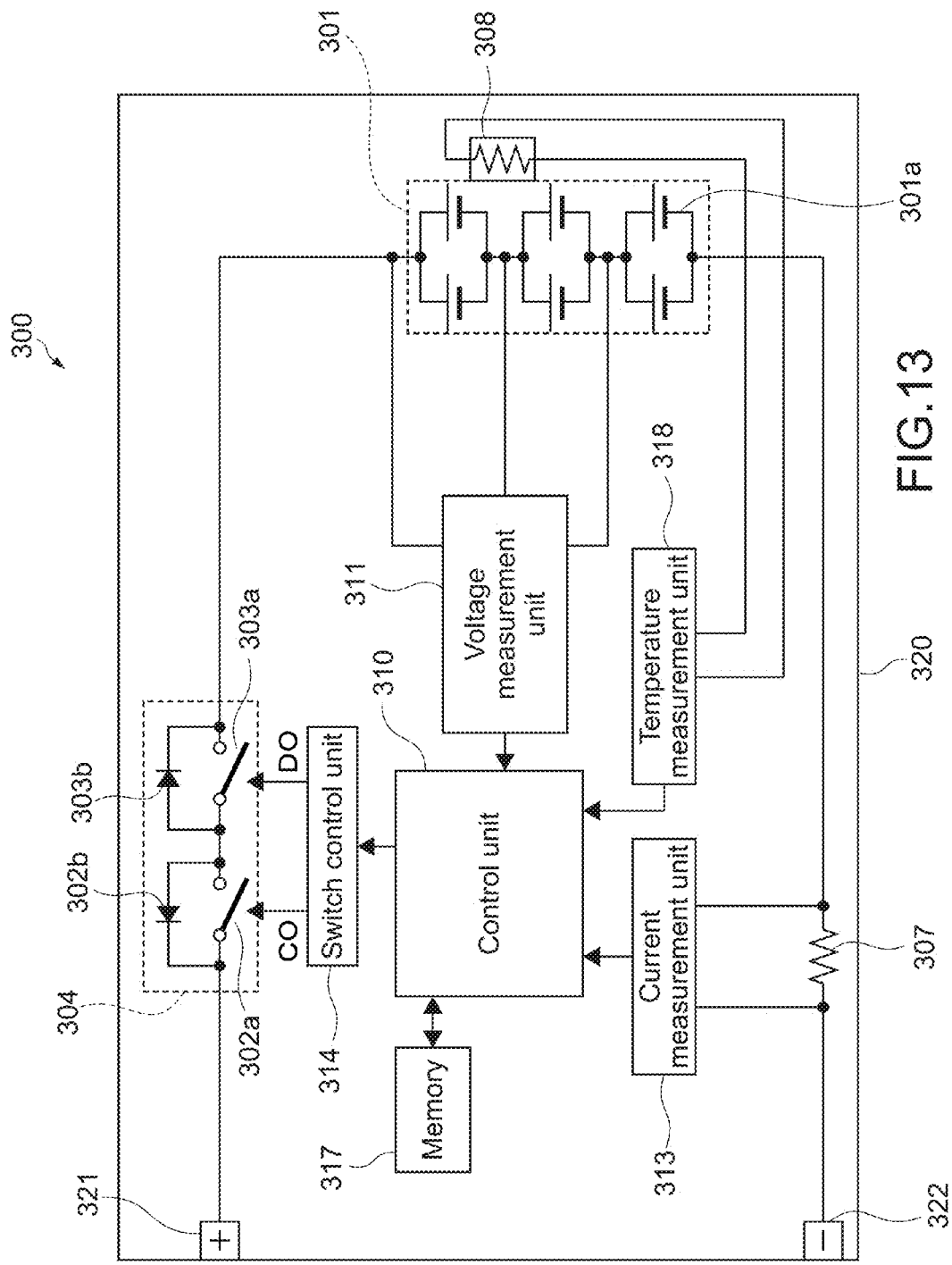
FIG. 13 is a block diagram showing a structure of a battery pack according to an embodiment of the present disclosure.

FIG. 13 is a block diagram showing an example of a circuit structure of a battery pack including a secondary battery. A battery pack 300 mainly includes a cell 301, a switch unit 304, a control unit 310, and a package body 320 that supports those components.

The battery pack 300 includes a positive electrode terminal 321 and a negative electrode terminal 322 and is recharged through the positive electrode terminal 321 and the negative electrode terminal 322 that are connected to a positive electrode terminal and a negative electrode terminal of a battery charger, respectively, at a time of charge. Further, at a time of using an electronic apparatus, the battery pack 300 is discharged through the positive electrode terminal 321 and the negative electrode terminal 322 that are connected to a positive electrode terminal and a negative electrode terminal of the electronic apparatus, to thereby supply power to a power receiving circuit of the electronic apparatus.

The cell 301 is constituted of an assembled battery in which a plurality of secondary batteries 301a are connected to one another in series and/or in parallel. To the secondary batteries 301a, the non-aqueous electrolyte battery 20 described in the first embodiment is applied. It should be noted that FIG. 13 shows an example in which six secondary batteries 301a are connected to one another, two in parallel and three in series (2P3S configuration). In addition to this configuration, any connection method such as a configuration in which n batteries are connected in parallel and m batteries are connected in series (n and m are integers) may be adopted.

The switch unit 304 includes a charge control switch 302a, a diode 302b, and a discharge control switch 303a, and a diode 303b and is controlled by a switch control unit 314.

The diode 302b has the polarity having an opposite direction with respect to charge current flowing from the positive electrode terminal 321 to the cell 301 and having a forward direction with respect to discharge current flowing from the negative electrode terminal 322 to the cell 301. The diode 303b has the polarity having a forward direction with respect to the charge current and having an opposite direction with respect to the discharge current. It should be noted that the switch unit 304 is provided on the positive electrode terminal 321 side, but it may be provided on the negative electrode terminal 322 side.

In the case where a battery voltage reaches an overcharge detection voltage, the charge control switch 302a is turned off and is controlled by the control unit 310 such that the charge current does not flow in a current path of the cell 301. After the charge control switch 302a is turned off, only discharge can be performed via the diode 302b. Further, in the case where a large amount of current flows at a time of charge, the charge control switch 302a is turned off and is controlled by the control unit 310 such that the charge current flowing in the current path of the cell 301 is shut off.

In the case where the battery voltage reaches an overdischarge detection voltage, the discharge control switch 303a is turned off and is controlled by the control unit 310 such that the discharge current does not flow in the current path of the cell 301. After the discharge control switch 303a is turned off, only charge can be performed via the diode 303b. Further, in the case where a large amount of current flows at a time of discharge, the discharge control switch 303a is turned off and is controlled by the control unit 310 such that the discharge current flowing in the current path of the cell 301 is shut off.

A temperature detection element 308 is provided in the vicinity of the cell 301, and measures a temperature of the cell 301 and supplies the measured temperature to a temperature measurement unit 318. The temperature detection element 308 is a thermistor, for example. The temperature measurement unit 318 supplies information on the temperature measured using the temperature detection element 308 to the control unit 310. The control unit 310 controls charge and discharge at a time of abnormal heat generation based on the output of the temperature measurement unit 318 or performs correction in calculation of the remaining capacity.

A voltage measurement unit 311 measures voltages of the cell 301 and of the secondary batteries 301a that constitute the cell 301, A/D-converts the measured voltages, and supplies them to the control unit 310. A current measurement unit 313 measures a current using a current detection resistor 307 and supplies the measured current to the control unit 310.

The switch control unit 314 is controlled by the control unit 310, and controls the charge control switch 302a and the discharge control switch 303a of the switch unit 304 based on the voltage and current that are input from the voltage measurement unit 311 and the current measurement unit 313. The switch control unit 314 transmits a control signal of the switch unit 304 when a voltage of any one of secondary batteries 301a reaches the overcharge detection voltage or less or the overdischarge detection voltage or less, or a large amount of current flows rapidly, to thereby prevents overcharge, overdischarge, and over-current charge and discharge.

Here, in the case of a lithium-ion secondary battery, an overcharge detection voltage is defined to be 4.20 V±0.05 V, for example, and an overdischarge detection voltage is defined to be 2.4 V±0.1 V, for example.

For the charge control switch 302a and the discharge control switch 303a, a semiconductor switch such as a MOSFET (metal-oxide semiconductor field-effect transistor) is used. In this case, parasitic diodes of the MOSFET function as diode units 302b and 303b. In the case where p-channel FETs (field-effect transistors) are used as the charge control switch 302a and the discharge control switch 303a, the switch control unit 314 supplies a control signal DO and a control signal CO to a gate of the charge control switch 302a and that of the discharge control switch 303a, respectively.

In the case where the charge control switch 302a and the discharge control switch 303a are of p-channel type, the charge control switch 302a and the discharge control switch 303a are turned on by a gate potential lower than a source potential by a predetermined value or more. In other words, in normal charge and discharge operations, the control signals CO and DO are determined to be a low level and the charge control switch 302a and the discharge control switch 303a are turned off.

A memory 317 is constituted of a RAM (random access memory), a ROM (read only memory), an EPROM (erasable programmable read only memory) serving as a nonvolatile memory, or the like. In the memory 317, numerical values computed by the control unit 310, an internal resistance value of a battery in an initial state of each secondary battery 301a, which has been measured in a stage of a manufacturing process, and the like are stored in advance, and can be rewritten as appropriate. Further, when a full charge capacity of the secondary battery 301a is stored, for example, a remaining capacity can be calculated together with the control unit 310.

Although the embodiments of the present disclosure have been described above, the present disclosure is not limited thereto. The present disclosure can be variously modified based on the technical ideas of the present disclosure.

In the embodiments described above, for example, the lithium-ion secondary battery has been described as an example, but the present disclosure is not limited thereto. The present disclosure is also applicable to a nickel hydrogen battery, a nickel cadmium battery, a lithium-manganese dioxide battery, a lithium-iron sulfide battery, and separators for those batteries.

Further, although the non-aqueous electrolyte secondary battery having a wound structure has been described in the embodiments described above, in addition thereto, the present disclosure is similarly applicable to a battery having a structure in which a positive electrode and a negative electrode are folded back or laminated. In addition, the present disclosure is also applicable to batteries of a so-called coin type, button type, square type, and the like. Furthermore, the present disclosure is also applicable to a primary battery without being limited to a secondary battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery separator, comprising:
   a porous base material including
     a first surface,
     a second surface opposed to the first surface, and
     a hole that is formed in the porous base material and causes the first surface and the second surface to communicate with each other; and
   a heat-resistant layer configured to cover at least the first surface and a surface of the hole, the heat-resistant layer being formed of an inorganic material and deposited by an atomic layer deposition method,
   wherein the heat-resistant layer that covers the first surface has a thickness larger than that of the heat-resistant layer that covers the surface of the hole.

2. The battery separator according to claim 1, wherein the heat-resistant layer has a thickness of 2 nm or more and 10 nm or less.

3. The battery separator according to claim 1, wherein the heat-resistant layer covers the first surface, the second surface, and the surface of the hole.

4. The battery separator according to claim 1, wherein the inorganic material is any one of an aluminum oxide, a silicon oxide, and a titanium oxide.

5. The battery separator according to claim 1, wherein the base material is a polyolefin-based resin.

6. The battery separator according to claim 1, wherein the base material has a thickness of 5 μm or more and 20 μm or less.

7. The battery separator according to claim 1, wherein the hole has an inner diameter of 50 nm or more and 100 nm or less.

8. A method of manufacturing a battery separator, comprising:
   preparing a porous base material including
     a first surface,
     a second surface opposed to the first surface, and
     a hole that is formed in the porous base material and causes the first surface and the second surface to communicate with each other; and
   forming a heat-resistant layer by an atomic layer deposition method, the heat-resistant layer being configured to cover at least the first surface and a surface of the hole and being formed of an inorganic material,
   wherein the heat-resistant layer that covers the first surface has a thickness larger than that of the heat-resistant layer that covers the surface of the hole.

9. The method of manufacturing a battery separator according to claim 8, wherein
   the heat-resistant layer is alternately formed on the first surface and the second surface.

10. A battery, comprising:
    a positive electrode;
    a negative electrode;
    an electrolyte layer arranged between the positive electrode and the negative electrode; and
    a separator including
      a porous base material including a first surface opposed to the positive electrode, a second surface opposed to the negative electrode, and a hole that is formed in the porous base material and causes the first surface and the second surface to communicate with each other, and a heat-resistant layer to cover at least the first surface and a surface of the hole, the heat-resistant layer being formed of an inorganic material and deposited by an atomic layer deposition method, wherein the heat-resistant layer that covers the first surface has a thickness larger than that of the heat-resistant layer that covers the surface of the hole.

11. A battery pack, comprising:
a battery including
   a positive electrode,
   a negative electrode,
   an electrolyte layer arranged between the positive electrode and the negative electrode, and
   a separator including
      a porous base material including a first surface opposed to the positive electrode, a second surface opposed to the negative electrode, and a hole that is formed in the porous base material and causes the first surface and the second surface to communicate with each other, and
      a heat-resistant layer to cover at least the first surface and a surface of the hole, the heat-resistant layer being formed of an inorganic material and deposited by an atomic layer deposition method;
a control unit configured to control charge and discharge of the battery; and
a package body configured to support the battery and the control unit,
wherein the heat-resistant layer that covers the first surface has a thickness larger than that of the heat-resistant layer that covers the surface of the hole.

12. An electronic apparatus, comprising:
a battery including
   a positive electrode,
   a negative electrode,
   an electrolyte layer arranged between the positive electrode and the negative electrode, and
   a separator including
      a porous base material including a first surface opposed to the positive electrode, a second surface opposed to the negative electrode, and a hole that is formed in the porous base material and causes the first surface and the second surface to communicate with each other, and
      a heat-resistant layer to cover at least the first surface and a surface of the hole, the heat-resistant layer being formed of an inorganic material and deposited by an atomic layer deposition method; and
a power receiving circuit configured to receive power supply from the battery,
wherein the heat-resistant layer that covers the first surface has a thickness larger than that of the heat-resistant layer that covers the surface of the hole.

13. A battery separator, comprising:
a porous base material including
   a first surface,
   a second surface opposed to the first surface, and
   a hole that is formed in the porous base material and causes the first surface and the second surface to communicate with each other; and
a heat-resistant layer configured to cover at least the first surface and a surface of the hole, the heat-resistant layer being formed of an inorganic material and deposited by an atomic layer deposition method,
wherein a thickness of the heat-resistant layer that covers the surface of the hole is reduced as a distance from the first surface and the second surface is increased.

14. The battery separator according to claim 13, wherein the heat-resistant layer has a thickness of 2 nm or more and 10 nm or less.

15. The battery separator according to claim 13, wherein the heat-resistant layer covers the first surface, the second surface, and the surface of the hole.

16. The battery separator according to claim 13, wherein the inorganic material is any one of an aluminum oxide, a silicon oxide, and a titanium oxide.

17. The battery separator according to claim 13, wherein the base material is a polyolefin-based resin.

18. The battery separator according to claim 13, wherein the base material has a thickness of 5 µm or more and 20 µm or less.

19. The battery separator according to claim 13, wherein the hole has an inner diameter of 50 nm or more and 100 nm or less.

20. A battery separator, comprising:
a porous base material including
   a first surface,
   a second surface opposed to the first surface, and
   a hole that is formed in the porous base material and causes the first surface and the second surface to communicate with each other; and
a heat-resistant layer configured to cover at least the first surface and a surface of the hole, the heat-resistant layer being formed of an inorganic material and deposited by an atomic layer deposition method,
wherein in the heat-resistant layer that covers the surface of the hole, the thickness of the heat-resistant layer provided at the center in a thickness direction of the battery separator is thinner than that of other portions of the heat-resistant layer.

21. The battery separator according to claim 20, wherein the heat-resistant layer has a thickness of 2 nm or more and 10 nm or less.

22. The battery separator according to claim 20, wherein the heat-resistant layer covers the first surface, the second surface, and the surface of the hole.

23. The battery separator according to claim 20, wherein the inorganic material is any one of an aluminum oxide, a silicon oxide, and a titanium oxide.

24. The battery separator according to claim 20, wherein the base material is a polyolefin-based resin.

25. The battery separator according to claim 20, wherein the base material has a thickness of 5 µm or more and 20 µm or less.

26. The battery separator according to claim 20, wherein the hole has an inner diameter of 50 nm or more and 100 nm or less.

27. A method of manufacturing a battery separator, comprising:
preparing a porous base material including
   a first surface,
   a second surface opposed to the first surface, and
   a hole that is formed in the porous base material and causes the first surface and the second surface to communicate with each other; and
forming a heat-resistant layer by an atomic layer deposition method, the heat-resistant layer being configured to cover at least the first surface and a surface of the hole and being formed of an inorganic material,
wherein a thickness of the heat-resistant layer that covers the surface of the hole is reduced as a distance from the first surface and the second surface is increased.

28. A method of manufacturing a battery separator, comprising:

preparing a porous base material including
  a first surface,
  a second surface opposed to the first surface, and
  a hole that is formed in the porous base material and causes the first surface and the second surface to communicate with each other; and
forming a heat-resistant layer by an atomic layer deposition method, the heat-resistant layer being configured to cover at least the first surface and a surface of the hole and being formed of an inorganic material,
wherein in the heat-resistant layer that covers the surface of the hole, the thickness of the heat-resistant layer provided at the center in a thickness direction of the battery separator is thinner than that of other portions of the heat-resistant layer.

29. A battery, comprising:
a positive electrode;
a negative electrode;
an electrolyte layer arranged between the positive electrode and the negative electrode; and
a separator including
  a porous base material including a first surface opposed to the positive electrode, a second surface opposed to the negative electrode, and a hole that is formed in the porous base material and causes the first surface and the second surface to communicate with each other, and
  a heat-resistant layer to cover at least the first surface and a surface of the hole, the heat-resistant layer being formed of an inorganic material and deposited by an atomic layer deposition method,
wherein a thickness of the heat-resistant layer that covers the surface of the hole is reduced as a distance from the first surface and the second surface is increased.

30. A battery, comprising:
a positive electrode;
a negative electrode;
an electrolyte layer arranged between the positive electrode and the negative electrode; and
a separator including
  a porous base material including a first surface opposed to the positive electrode, a second surface opposed to the negative electrode, and a hole that is formed in the porous base material and causes the first surface and the second surface to communicate with each other, and
  a heat-resistant layer to cover at least the first surface and a surface of the hole, the heat-resistant layer being formed of an inorganic material and deposited by an atomic layer deposition method,
wherein in the heat-resistant layer that covers the surface of the hole, the thickness of the heat-resistant layer provided at the center in a thickness direction of the battery separator is thinner than that of other portions of the heat-resistant layer.

31. A battery pack, comprising:
a battery including
  a positive electrode,
  a negative electrode,
  an electrolyte layer arranged between the positive electrode and the negative electrode, and
  a separator including
    a porous base material including a first surface opposed to the positive electrode, a second surface opposed to the negative electrode, and a hole that is formed in the porous base material and causes the first surface and the second surface to communicate with each other, and
    a heat-resistant layer to cover at least the first surface and a surface of the hole, the heat-resistant layer being formed of an inorganic material and deposited by an atomic layer deposition method;
a control unit configured to control charge and discharge of the battery; and
a package body configured to support the battery and the control unit,
wherein a thickness of the heat-resistant layer that covers the surface of the hole is reduced as a distance from the first surface and the second surface is increased.

32. A battery pack, comprising:
a battery including
  a positive electrode,
  a negative electrode,
  an electrolyte layer arranged between the positive electrode and the negative electrode, and
  a separator including
    a porous base material including a first surface opposed to the positive electrode, a second surface opposed to the negative electrode, and a hole that is formed in the porous base material and causes the first surface and the second surface to communicate with each other, and
    a heat-resistant layer to cover at least the first surface and a surface of the hole, the heat-resistant layer being formed of an inorganic material and deposited by an atomic layer deposition method;
a control unit configured to control charge and discharge of the battery; and
a package body configured to support the battery and the control unit,
wherein in the heat-resistant layer that covers the surface of the hole, the thickness of the heat-resistant layer provided at the center in a thickness direction of the battery separator is thinner than that of other portions of the heat-resistant layer.

33. An electronic apparatus, comprising:
a battery including
  a positive electrode,
  a negative electrode,
  an electrolyte layer arranged between the positive electrode and the negative electrode, and
  a separator including
    a porous base material including a first surface opposed to the positive electrode, a second surface opposed to the negative electrode, and a hole that is formed in the porous base material and causes the first surface and the second surface to communicate with each other, and
    a heat-resistant layer to cover at least the first surface and a surface of the hole, the heat-resistant layer being formed of an inorganic material and deposited by an atomic layer deposition method; and
a power receiving circuit configured to receive power supply from the battery,
wherein a thickness of the heat-resistant layer that covers the surface of the hole is reduced as a distance from the first surface and the second surface is increased.

34. An electronic apparatus, comprising:
a battery including
  a positive electrode,
  a negative electrode, an electrolyte layer arranged between the positive electrode and the negative electrode, and a separator including
- a porous base material including a first surface opposed to the positive electrode, a second surface opposed to the negative electrode, and a hole that is formed in the porous base material and causes the first surface and the second surface to communicate with each other, and
- a heat-resistant layer to cover at least the first surface and a surface of the hole, the heat-resistant layer being formed of an inorganic material and deposited by an atomic layer deposition method; and a power receiving circuit configured to receive power supply from the battery, wherein in the heat-resistant layer that covers the surface of the hole, the thickness of the heat-resistant layer provided at the center in a thickness direction of the battery separator is thinner than that of other portions of the heat-resistant layer.

* * * * *